(12) United States Patent
Hoop et al.

(10) Patent No.: US 9,545,711 B2
(45) Date of Patent: Jan. 17, 2017

(54) PERCUSSION MECHANISM

(71) Applicant: Hilti Aktiengesellschaft, Schaan (LI)

(72) Inventors: Alexander Hoop, Schaan (LI); Michael Wierer, Bludenz (AT); Albert Binder, Buchs (CH); Dieter Profunser, Zwischenwasser (AT); Stefan Battlogg, St. Anton i. M. (AT); Juergen Poesel, Bludenz (AT)

(73) Assignee: Hilti Aktiengesellschaft, Schaan (LI)

( * ) Notice: Subject to any disclaimer, the term of this patent is extended or adjusted under 35 U.S.C. 154(b) by 444 days.

(21) Appl. No.: 14/356,511

(22) PCT Filed: Oct. 17, 2012

(86) PCT No.: PCT/EP2012/070533
§ 371 (c)(1),
(2) Date: May 6, 2014

(87) PCT Pub. No.: WO2013/068212
PCT Pub. Date: May 16, 2013

(65) Prior Publication Data
US 2014/0311763 A1    Oct. 23, 2014

(30) Foreign Application Priority Data

Nov. 7, 2011   (DE) .................. 10 2011 085 816
Dec. 12, 2011  (DE) .................. 10 2011 088 287

(51) Int. Cl.
*E21B 3/00*       (2006.01)
*E21B 17/22*      (2006.01)
*E21B 19/16*      (2006.01)
*E21B 19/18*      (2006.01)
*B25F 5/00*       (2006.01)
*B25B 21/02*      (2006.01)
*F16D 5/00*       (2006.01)
(Continued)

(52) U.S. Cl.
CPC ............... *B25F 5/005* (2013.01); *B25B 21/02* (2013.01); *F16D 5/00* (2013.01); *F16D 37/02* (2013.01); *F16D 2037/007* (2013.01)

(58) Field of Classification Search
CPC .......... E21B 4/02; E21B 41/0085; E21B 6/00; B25B 21/02; B25F 5/005
USPC ............ 173/2, 114, 117, 118, 201–204, 121, 212, 173/176, 132, 48, 104, 109, 217–218
See application file for complete search history.

(56) References Cited

U.S. PATENT DOCUMENTS

2004/0020667 A1    2/2004  Gokturk et al.
2005/0087410 A1*   4/2005  Namuduri ............... F16F 9/535
                                                        188/267.2
(Continued)

FOREIGN PATENT DOCUMENTS

EP    146 22 19    9/2004
EP    1677022      7/2006
JP    55020917     2/1980

*Primary Examiner* — Robert Long
(74) *Attorney, Agent, or Firm* — Davidson, Davidson & Kappel, LLC

(57) ABSTRACT

A percussion mechanism includes a first shaft and a second shaft. One or more vanes are fastened to the first shaft. The vanes are arranged so as to be rotatable in a chamber of the second shaft. The chamber is filled with a magnetorheological fluid. A magnetic field source on the second shaft generates a magnetic field that is spatially modulated in the circumferential direction inside the chamber.

10 Claims, 3 Drawing Sheets

(51) Int. Cl.
*F16D 37/02* (2006.01)
*F16D 37/00* (2006.01)

(56) References Cited

U.S. PATENT DOCUMENTS

| | | | | |
|---|---|---|---|---|
| 2007/0010119 A1* | 1/2007 | Hall | ............... | E21B 17/028 |
| | | | | 439/310 |
| 2007/0114064 A1* | 5/2007 | Hall | ............... | E21B 4/00 |
| | | | | 175/57 |
| 2007/0221408 A1* | 9/2007 | Hall | ............... | E21B 4/06 |
| | | | | 175/57 |
| 2008/0289440 A1* | 11/2008 | Denk | ............... | H02K 7/09 |
| | | | | 74/89.34 |
| 2010/0236802 A1* | 9/2010 | Berger | ............... | B25D 11/064 |
| | | | | 173/118 |
| 2010/0300819 A1* | 12/2010 | Hiemenz | ............... | F16F 9/537 |
| | | | | 188/267.2 |
| 2011/0121223 A1* | 5/2011 | Ulicny | ............... | F16F 9/535 |
| | | | | 252/62.52 |
| 2013/0133909 A1* | 5/2013 | Greenwood | ............... | B06B 1/04 |
| | | | | 173/90 |
| 2013/0133910 A1* | 5/2013 | Riedl | ............... | B25D 16/00 |
| | | | | 173/109 |
| 2014/0311763 A1* | 10/2014 | Hoop | ............... | B25B 21/02 |
| | | | | 173/218 |
| 2015/0075833 A1* | 3/2015 | Dotan | ............... | B23Q 5/06 |
| | | | | 173/218 |

* cited by examiner

PERCUSSION MECHANISM

The present invention relates to a percussion mechanism for generating angular momenta, in particular a handheld power tool having a percussion mechanism of this type.

SUMMARY OF THE INVENTION

The percussion mechanism according to the present invention has a first shaft and a second shaft. One or multiple vanes are fastened to the first shaft. The vanes are rotatably situated in a chamber of the second shaft. The chamber is filled with a magnetorheological fluid. A magnetic field source on the second shaft generates a spatially modulated magnetic field in the circumferential direction in the chamber.

The first shaft is able to rotate together with the vanes within the chamber. The vanes displace the magnetorheological fluid or push the magnetorheological fluid in front of themselves in the circumferential direction. The force acting upon the vanes depends on the apparent viscosity of the fluid, which, in the case of a magnetorheological fluid, is quickly and reversibly variable by a magnetic field.

Depending on the magnetic field, magnetorheological fluids may absorb a shear stress. If the yield point is exceeded, a magnetorheological fluid may be viewed as a fluid having a viscosity which is dependent on the magnetic field, for example if different forces may be generated at a constant rotational speed or shear rate as a function of the magnetic field. To simplify the description, the rheological properties of the fluid are referred to below as viscosity, the apparent viscosity at a certain working point always being meant hereby.

The anisotropic magnetic field causes the magnetorheological fluid to appear to have a varying viscosity along the circumference. The areas of high viscosity and low viscosity are fixed with respect to the second shaft, i.e., they rotate together with the second shaft around a rotation axis. A different torque therefore acts upon the vanes of the first shaft as a function of the relative angularity of the first shaft and the second shaft and the generated magnetic field. The vanes are preferably dimensioned in such a way that they dip into the areas of higher viscosity in a first angular position of the first shaft and are outside the areas of higher viscosity in a second angular position of the first shaft. The vanes do not have a rotationally symmetrical shape.

A motor may accelerate the second shaft relative to the first shaft essentially without transmitting a torque if the vanes are in an area of low viscosity, for the purpose of then quickly outputting the absorbed rotary pulse as a high torque when the vanes dip into an area of high viscosity.

One embodiment provides that the magnetic field source includes pole shoes which are situated on the chamber on the second shaft, offset in the circumferential direction. A permanent magnet or an electromagnet may generate the magnetic field. The pole shoes deflect the magnetic flux to or within the chamber for the purpose of generating preferably pronounced local maxima (poles) of the magnetic field strength, in which the fluid may transmit high forces. The pole shoes may be provided by additional vanes which are rotatably fixedly connected to the second shaft and which are situated axially to mesh with the vanes of the first shaft. A high magnetic field strength may be implemented between the vane-shaped pole shoes, the magnetic field strength simultaneously decreasing rapidly, offset in the circumferential direction.

One embodiment provides that at least one of the vanes of the first shaft is designed as a roller which is situated radially offset with respect to the first shaft.

A dimension of the vane in the circumferential direction may be less than 30 degrees. A dimension of the area of higher viscosity in the circumferential direction may be less than 30 degrees; in particular, a dimension of the pole shoes in the circumferential direction may be less than 10 degrees. This results in large areas of low viscosity between the viscous areas. The second shaft may be accelerated with respect to the first shaft for the purpose of then abruptly outputting the absorbed energy when the vanes dip into a viscous area.

A handheld power tool includes a motor, a tool holder and a percussion mechanism according to one of the preceding claims, which is connected in a drive train between the motor and the tool holder. The magnetic field source may include an electromagnet and a settable power source. An operating element is provided for setting a current output by the power source. The percussion effect may be continuously set by the user and be superimposed by a regulation, for example to compensate for the temperature or to maintain certain limiting values. A short, high torque or a longer-lasting and low torque may be output as a function of the viscosity when the vanes dip into the viscous fluid.

BRIEF DESCRIPTION OF THE DRAWINGS

The following description explains the present invention on the basis of exemplary specific embodiments and figures.

Elements which are identical or have identical functions are indicated by the same reference numerals in the figures, unless otherwise specified.

DETAILED DESCRIPTION OF THE INVENTION

Figure 1:
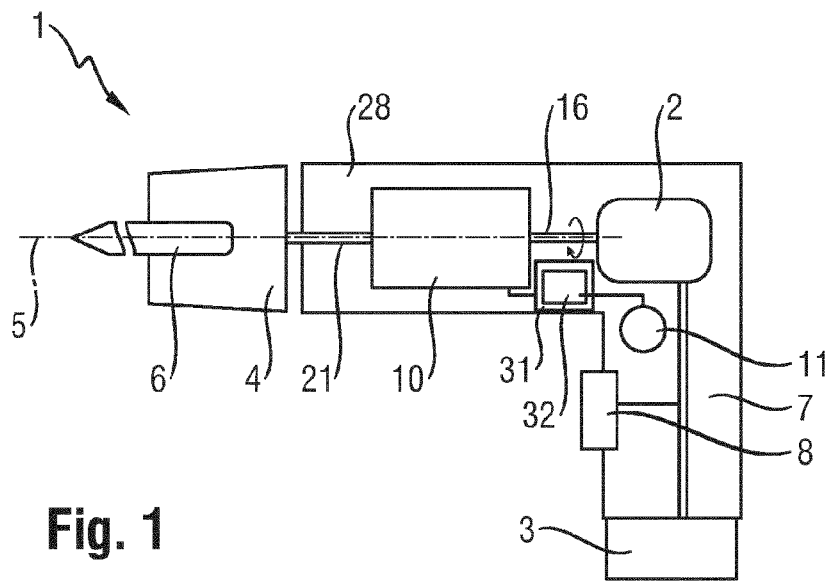
FIG. 1 shows a percussion screwdriver.

FIG. 1 shows an electric percussion screwdriver 1 as an example of a handheld power tool.

The primary drive is an electric motor 2, which is supplied with electricity, for example, via a rechargeable battery pack 3. A tool holder 4 is rotatably driven by electric motor 2 around a working axis 5 during operation. Tool holder 4 is designed to detachably accommodate a screwdriver bit, a drill or other tools 6 and to transmit the rotary motion to this tool. A user may guide percussion screwdriver 1 with the aid of a handle 7 and put it into operation with the aid of a system switch 8. Percussion screwdriver 1 has a percussion mechanism 10 which couples electric motor 2 with tool holder 4. Percussion mechanism 10 generates a pulsating torque from the uniformly output torque of electric motor 2, which is passed on to tool holder 4. An amplitude of the torque pulses is settable with the aid of a selector switch 11.

Figure 2:
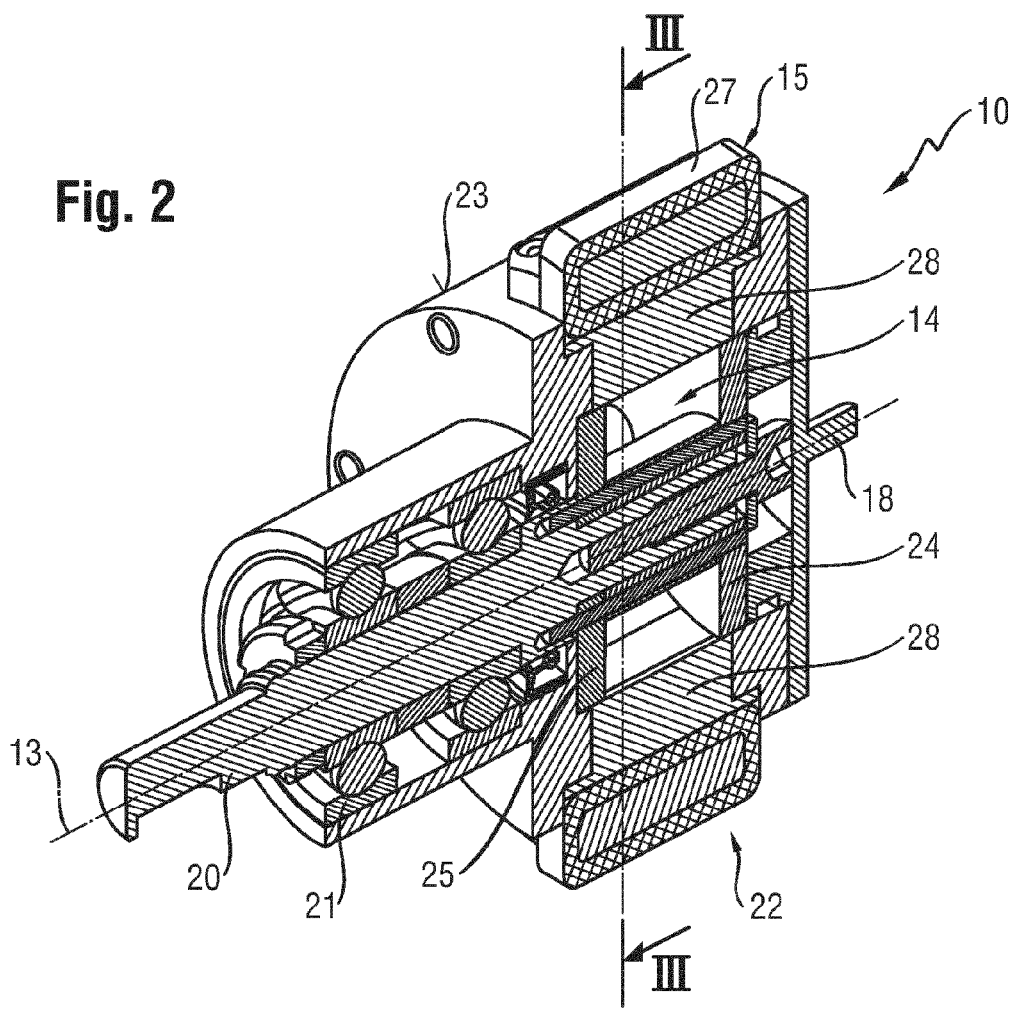
FIGS. 2 and 3 show a percussion mechanism.
Figure 3:
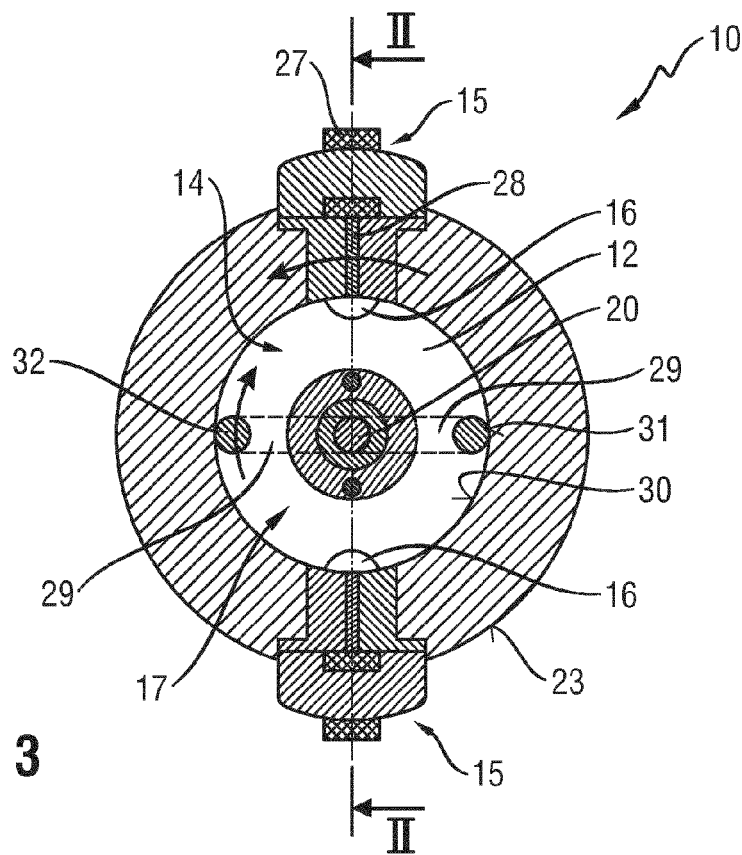

FIG. 2 shows a longitudinal sectional view of percussion mechanism 10 in plane II-II, and FIG. 3 shows a cross sectional view of percussion mechanism 10 in plane III-III. Exemplary percussion mechanism 10 has an impeller 12, which is rotatably situated around a rotation axis 13 in a chamber 14. Chamber 14 is filled with a magnetorheological fluid. Magnets 15 are situated on chamber 14, which locally increase a viscosity of the magnetorheological fluid in areas 16 (viscous areas) adjacent to the chamber with respect to other areas 17 (low-viscosity areas). A drive shaft 18 rotates chamber 14 together with magnets 15 around rotation axis 13. Low-viscosity areas 17 convey a negligible low torque to impeller 12, while viscous areas 16 transfer a torque to impeller 12. Accordingly, an active torque transfer occurs when magnets 15 are aligned with vanes 19 of impeller 12. Impeller 12 is connected to an output shaft 20.

Drive shaft 18 may be a hollow shaft, in which output shaft 20 is suspended on roller bearings 21. Drive shaft 18 and output shaft 20 are rotatable relative to each other around rotation axis 13.

A drum 22 is provided in the radial direction by a jacket-shaped wall 23 of drive shaft 18 and, along rotation axis 13, by a base 24 and a cover 25. Base 24 and cover 25 are fastened by way of example to output shaft 20 and are rotatable with respect to jacket 23 formed by hollow shaft 18. Chamber 14 within drum 22 is tightly sealed in the sense that the magnetorheological fluid is unable to escape. Cover 25 has a sealed bearing 26, through which output shaft 20 is guided into chamber 14. In chamber 14, impeller 12 is rotatable fixedly mounted on output shaft 20, e.g., using a force fit.

Magnets 15 are inserted into jacket 23 of drum 22. The two exemplary magnets 15 are situated diametrically with respect to rotation axis 13. Exemplary magnets 15 are electromagnets. Coils 27 of magnets 15 may be oriented by their axis perpendicularly to rotation axis 13 and tangentially to a circumferential direction around rotation axis 13. A pole shoe 28 is inserted into jacket 23 and connects magnet 15 to chamber 14 in the radial direction. The magnetic field generated by magnets 15 is not rotationally symmetrical around rotation axis 13 in chamber 14 but rather has a twofold symmetry, i.e. it has two poles.

Alternative specific embodiments, which are not illustrated, may have a greater number of magnets, which are preferably situated at equidistant angular intervals around rotation axis 13, which forms a correspondingly greater number of poles and a multifold symmetry. The magnetic field may also be generated inside or outside the drum without having to penetrate the jacket. The magnetic field generator should advantageously be allowed to remain stationary relative to the percussion screwdriver, and only one part of the poles should be allowed to rotate as part of the jacket. Permanent magnets or a combination of permanent magnets and electromagnets are preferably used to generate the magnetic field.

The magnetorheological fluid has the greatest viscosity in the areas of the highest magnetic field strength, i.e., at the poles. Precisely two viscous areas 16, which abut the poles, form at the two exemplary magnets 15 and thus at two poles. A dimension of viscous areas 16 is in the magnitude of the dimension of the pole shoe. A nonlinear dependency of the viscosity on the magnetic field strength limits the extension of viscous areas 16. Low-viscosity areas 17 have a much greater proportion on the circumference around rotation axis 13, typically between 75% and 90%. The drum and one part of the pole shoe should be made of nonferromagnetic material to generate the magnetic field, locally limited to the radially inner areas of the pole shoes.

Exemplary impeller 12 has precisely two vanes 29, it being possible to use only one vane or also multiple vanes. The same number of vanes and poles are preferably used; however, different numbers of vanes and poles may also be used. Vanes 29 extend to the inner surface 30 of jacket 23. When drum 22 rotates, vanes 29, or at least their outer ends 31, come into contact with viscous areas 16. A diameter of impeller 12, with the exception of a radial clearance, may be equal to the diameter of chamber 14, other ends 31 sliding along inner surface 30. In the illustrated specific embodiment, vanes 29 are provided by rollers 32, which are fastened to base 24 and to cover 25. Rollers 32 may roll on inner surface 30.

The symmetry of impeller 12 is preferably adapted to the rotational symmetry of the magnetic field. Outer ends 31 of vanes 29 synchronously come into contact with viscous areas 16 or are collectively in low viscosity areas 17.

As long as outer ends 31 remain in low-viscosity areas 17, electric motor 2 is able to accelerate drive shaft 18 and drum 22 with almost no counter-torque. The applied power of electric motor 2 is stored in kinetic energy in drive shaft 18 and drum 22. When outer ends 31 strike viscous areas 16, output shaft 20 is coupled to drum 22. The maximum transmittable torque depends on the viscosity of viscous area 16, which helps influence the route within which drum 22 may be braked or delayed to the relative rotational speed of zero. The viscosity, in particular if viscous areas 16 are under a static load, is preferably insufficient to hold impeller 12 against the torque of electric motor 2 if output shaft 20 is blocked. Vanes 19 will be shifted through viscous area 16 and subsequently return to a low-viscosity area 17.

The viscosity of viscous areas 16 may be controlled by the magnetic field strength. In particular, a power source 33 is provided, which supplies coils 27. A supplied current may be switched by a control device 34 and/or have its amplitude set for the purpose of setting the magnetic field to an arbitrary value between zero and the maximum field. The current may also be modulated temporally or as a function of sensor signals; it is also provided to be able to activate multiple coils independently of each other.

With the aid of control device 34, the maximum transmittable torque may be set indirectly by the magnetic field strength. Furthermore, control device 34 may ascertain whether vanes 29 abut viscous areas 16 and, in response thereto, may reduce the magnetic field strength. Impeller 12 is actively disengaged, and drum 22 may be accelerated without impeller 12. The abutment may be detected, for example, with the aid of a position sensor for detecting a relative position of impeller 12 and drum 14 or an acceleration sensor for detecting an impact of impeller 12 on viscous areas 16.

Figure 4:
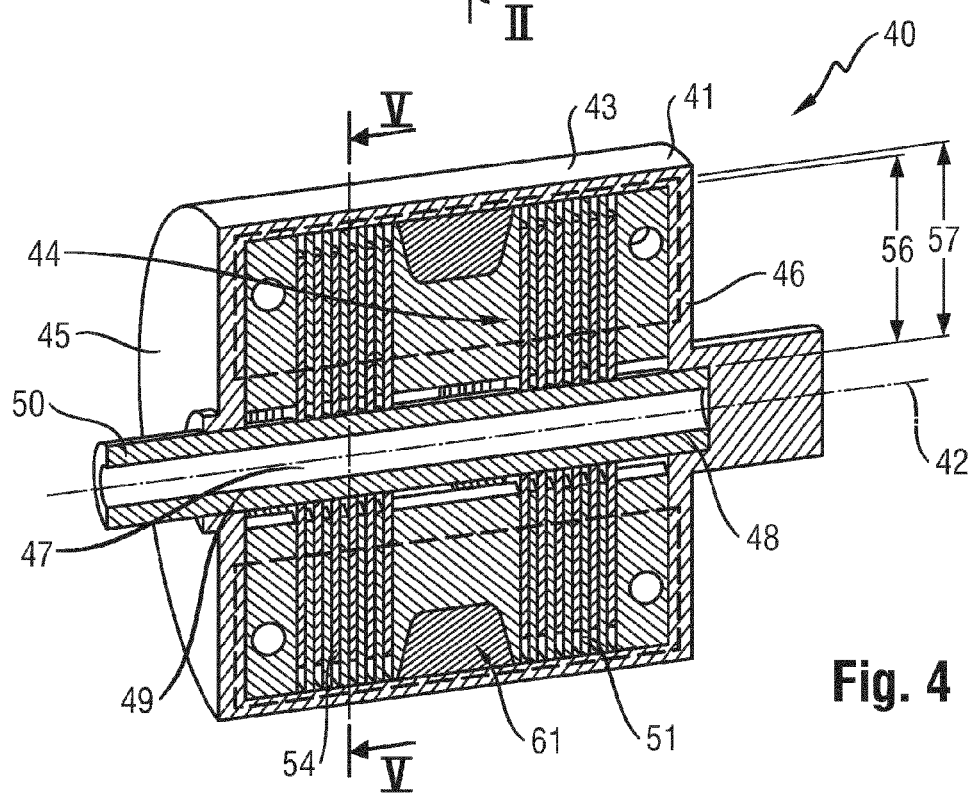
FIGS. 4 and 5 show a percussion mechanism.
Figure 5:
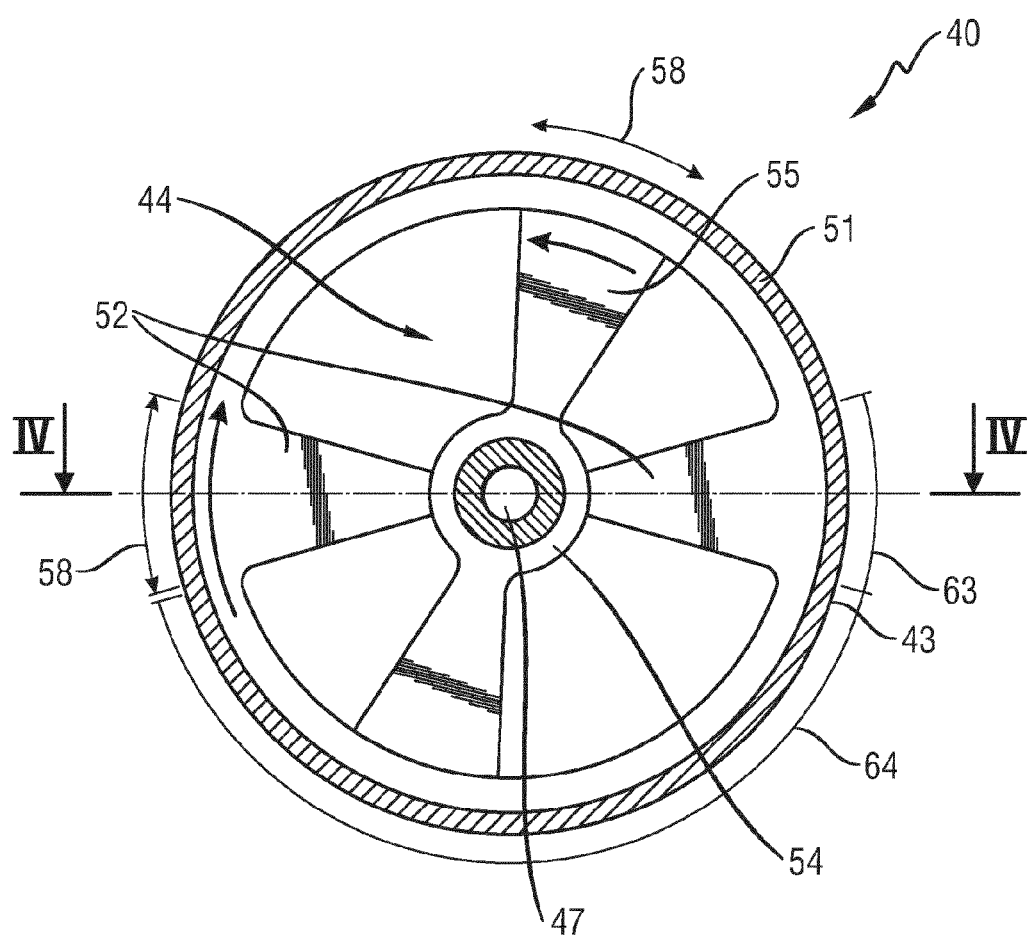

FIG. 4 shows a longitudinal sectional view of a percussion mechanism 40 in plane IV-IV, and FIG. 5 shows a cross-sectional view of percussion mechanism 40 in plane V-V. Percussion mechanism 40 has a drum 41, which is rotatably supported around a rotation axis 42. Drum 41 is essentially a rotational hollow body with respect to rotation axis 42, preferably a hollow cylinder. Chamber 44, which is radially surrounded by a jacket 43 of drum 41, is closed along rotation axis 42 by a base 45 and a cover 46 of drum 41. A shaft 47 is situated within drum 41, i.e., in cavity 44 and coaxially to shared rotation axis 42. Shaft 47 is rotatable around rotation axis 42 relative to drum 41. For example, shaft 47 is suspended in pivot bearings 48, 49 in drum 41. A section 50 of shaft 47 on the output side may be guided through an opening in cover 46. The opening is designed, for example, as pivot bearing 48.

Multiple first impellers 51 are situated axially offset from each other on jacket 43. First impellers 51 all have the same design. First impellers 51 may have, for example, two first vanes 52, which project radially in the direction of shaft 47 and do not touch shaft 47. The two first vanes 52 are preferably offset from each other by 180 degrees around rotation axis 42. If the number of vanes 52 per impeller 51 is greater, they are preferably situated equidistantly around rotation axis 42. Axially adjacent first vanes 52 are separated by a rotationally symmetrical gap 53. First impellers 51 are aligned equidistantly with respect to each other around rotation axis 42.

Multiple second impellers 54, which are axially offset from each other, are situated on shaft 47 in rotationally symmetrical gaps 53. Two vanes 55 of second impellers 54 project radially in the direction of jacket 43, these vanes not touching jacket 43. The number of second vanes 55 per second impeller 54 is preferably equal to the number of first vanes 52 per first impeller 51. Second vanes 55 of second impellers 54 are preferably aligned equidistantly around rotation axis 42.

Vanes 52, 55 are, for example, thin iron sheets whose dimensions along rotation axis 42 are at least one magnitude smaller than their dimension in the radial direction. This dimension is approximately the same size as the width of rotationally symmetrical gaps 53. A distance between adjacent first vanes 52 along rotation axis 42 may be approximately equal to a thickness of second vane 55 and vice versa. Vanes 52, 55 are preferably parallel to planes perpendicular to rotation axis 42.

Radial dimensions 56 of vanes 52, 55 are at least slightly smaller than a radial distance 57 of first shaft 47 from jacket 43. Radial dimensions 56 are greater than 75% of radial distance 57, e.g., greater than 90% of radial distance 57. Radial dimensions 56 of first vanes 52 and second vanes 55 may be selected to be different. However, the sum of radial dimensions 56 of each first vane 52, including its adjacent second vane 55, is greater than radial distance 57 to permit an overlap along rotation axis 42 of a first vane 52, with adjacent second vane 55. An overlap along rotation axis 42 is synonymous with an overlap in a projection onto a plane perpendicular to rotation axis 42.

First vanes 52 are situated along rotation axis 42, offset with respect to second vanes 55. None of first vanes 52 overlaps with one of second vanes 55 in the radial direction. Drum 41, along with first vanes 52, may be rotated relative to first shaft 47, along with second vanes 55. During the rotation, meshing positions and non-meshing positions alternate. In the meshing positions, first vanes 52 engage between second vanes 55 without touching in such a way that first vanes 52 and second vanes 55 at least partially overlap along rotation axis 42. In the non-meshing positions, first vanes 52 are rotated with respect to second vanes 55 in such a way that they do not overlap along rotation axis 42.

A dimension 58 in the circumferential direction (angular dimension) of vanes 52, 55 is selected in such a way that the non-meshing positions cover a rotation angle of at least the same size as the meshing positions. In the exemplary specific embodiment, vanes 52, 55 have an angular dimension 58 of approximately 30 degrees, and two first vanes 52 and two second vanes 55, respectively, are each situated on one plane. First vanes 52 mesh with second vanes 55 twice per rotation for approximately 180 degrees and are non-meshing twice per rotation for approximately 180 degrees. Two, three or four vanes 52, 55 are preferably each symmetrically situated on one plane. A sum of angular dimensions 58 of individual vanes 52, 55 on one plane preferably lies in a range between 30 degrees and 60 degrees. Angular dimensions 58 of first vanes 52 and second vanes 55 may be selected to be different. The number of first vanes 52 and second vanes 55 is the same on adjacent planes. First vanes 52 are preferably all situated in the same angular positions with respect to jacket 43, and second vanes 55 are preferably all situated in the same angular positions with respect to shaft 47, whereby all vanes 52, 55 are synchronously in meshing or non-meshing positions.

A magnetic coil 61 is situated in drum 41 coaxially to rotation axis 42 and supplied by a power source 62. First vanes 52 are made of a magnetizable material and guide the magnetic field; first vanes 52 are used as pole shoes. A magnetic field strength is higher in angle ranges 63 of first vanes 52 than in angle ranges 64 between first vanes 52.

Cavity 44 between jacket 43 and shaft 47 is at least partially filled with a magnetorheological fluid. A viscosity of the magnetorheological fluid is higher in angle ranges 63 of first vanes 52 than in remaining angle ranges 64, due to the anisotropic magnetic field. A transfer of torque from drum 41 to shaft 47 is higher in a meshing position than in a non-meshing position. Driving electric motor 2 may accelerate drum 41 during non-meshing positions and output the absorbed rotary pulse to shaft 47 during the meshing position.

The invention claimed is:

1. A percussion mechanism comprising:
   a first shaft, at least one vane fastened on the first shaft;
   a second shaft having a chamber, the at least one vane rotatably situated in the chamber, the chamber filled with a magnetorheological fluid; and
   a magnetic field source situated in the area of the second shaft, the magnetic field source, within the chamber, generating a spatially modulated magnetic field around the shaft in the circumferential direction.

2. The percussion mechanism as recited in claim 1 wherein the magnetic field induces areas of higher viscosity of the magnetorheological fluid in the chamber, and the at least one vane is dipped into the areas of higher viscosity in a first angular position of the first shaft and is outside the areas of higher viscosity in a second angular position of the first shaft.

3. The percussion mechanism as recited in claim 1 wherein, due to the magnetorheological fluid, a higher torque is transmitted in the angular positions in which the at least one vane is in areas having a high magnetic field than in the angular positions in which the at least one vane is in areas having a weak or no magnetic field.

4. The percussion mechanism as recited in claim 1 wherein the magnetic field source includes pole shoes situated on the chamber on the second shaft, offset in the circumferential direction.

5. The percussion mechanism as recited in claim 4 wherein the pole shoes are provided by additional vanes rotatably fixedly connected to the second shaft and situated axially to mesh with the at least one vane of the first shaft.

6. The percussion mechanism as recited in claim 1 wherein the at least one vane is designed as a roller situated radially offset with respect to the first shaft.

7. The percussion mechanism as recited in claim 1 wherein a width of the vanes in the circumferential direction is less than 30 degrees.

8. The percussion mechanism as recited in claim 3 wherein a dimension of the area of higher viscosity in the circumferential width is less than 30 degrees.

9. A handheld power tool comprising:
   a motor;
   a tool holder; and
   a percussion mechanism as recited in claim 1 and connected in a drive train between the motor and the tool holder.

10. The handheld power tool as recited in claim 9 wherein the magnetic field source includes an electromagnet and a settable power source, and further comprising an operating element for setting a current output by the power source.

* * * * *